United States Patent
Bronzini

[11] 3,759,536
[45] Sept. 18, 1973

[54] DEVICE FOR THE QUICK CHANGE OF TOOLHOLDERS

[76] Inventor: Bruno Bronzini, 18/4 Strada Alberoni, Turin, Italy

[22] Filed: June 17, 1971

[21] Appl. No.: 154,034

[52] U.S. Cl.................. 279/89, 279/1 E, 279/103, 90/11 D
[51] Int. Cl....................... B23b 31/02, B23b 31/10
[58] Field of Search ................. 279/91, 90, 89, 102, 279/1 B, 1 DA, 1 E, 103; 90/11 A, 11 D

[56] References Cited
UNITED STATES PATENTS
3,177,775  4/1965  Alisauskis.......................... 90/11 D
2,485,799  10/1949  Woytych............................ 90/11 A

FOREIGN PATENTS OR APPLICATIONS
585,767  2/1947  Great Britain..................... 90/11 A Primary Examiner—Gil Weidenfeld
Attorney—Young and Thompson

[57] ABSTRACT

A device for the quick change of toolholders comprises a support having a conical recess receiving a conical member that has a neck having a T-shaped head. The support has a washer with a slot disposed at right angles to the head and through which the head can pass only upon rotation through 90°. A nut is screw-threadedly received in the support and receives the T-shaped head through a slot through which the head falls upon rotation of the nut followed by pressure of the nut against the head in a disengaging direction. The T-shaped head falls on the washer, and the conical portion is rotated 90° to withdraw the head through the washer slot.

3 Claims, 2 Drawing Figures

PATENTED SEP 18 1973 3,759,536

INVENTOR
BRUNO BRONZINI
BY Young & Thompson
ATTYS

DEVICE FOR THE QUICK CHANGE OF TOOLHOLDERS

This invention relates to a simple and expedient device for the quick change of toolholders.

The experts in this field know very well that this problem, so far, could be solved only by means of rather complicated devices.

The device in question consists of a ring nut that can be screwed into a threaded bush, the nut and bush being provided with oblong holes, which the upper, enlarged part of the cone goes through, such that these oblong holes will offset to each other when nut turns. The invention will be understood better through the following specification of a preferred realization of the device in question, with reference to the enclosed drawing, where:

Figure 1:
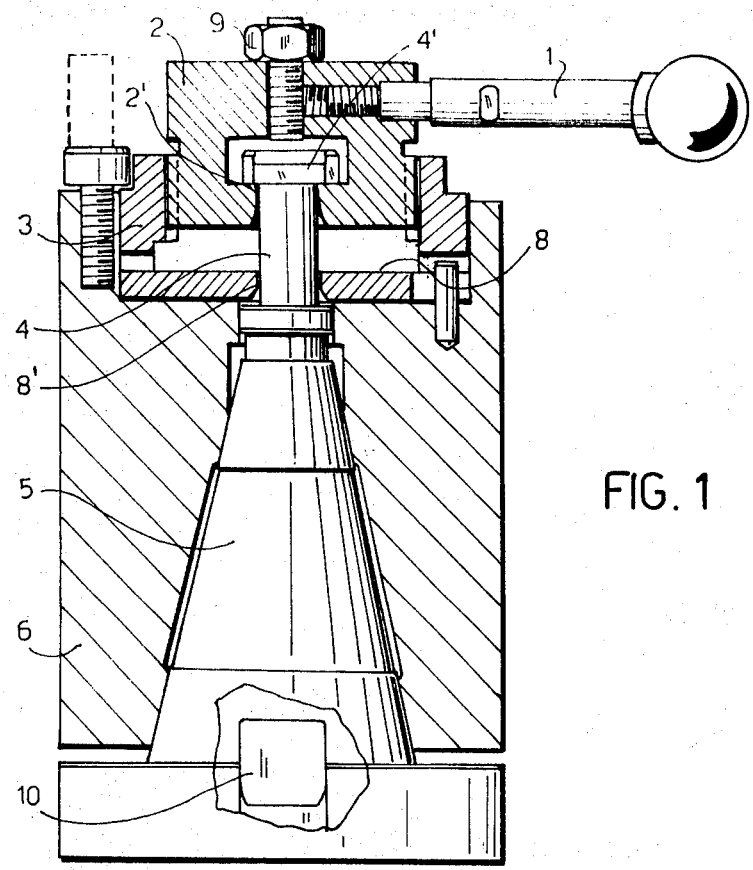
FIG. 1 is a vertical cross-section of the device in question.
Figure 2:
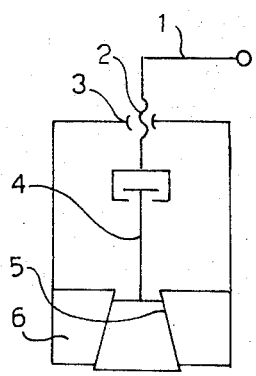
FIG. 2 is a diagrammatic representation of the same device.

With reference to the drawing, a lever 1 provided with a handle is fastened to a nut 2 that is screwed into a threaded bush 3. The latter is secured to the support 6.

The cone 5, received in a tapered recess in support 6, has a neck 4 which at its upper end is T-shaped as shown at 4' in FIG. 1.

Both the nut 2 and a washer 8 underlying the threaded bush 3 are provided with slots 2' and 8' the major dimension of which lies in a direction perpendicular to the plane of the drawing. Said major dimension is such as to accommodate the T-shaped part 4' of neck 4.

A bolt 9 threaded vertically in the center of nut 2 terminates with its shank a short distance from the upper end of neck 4. A key 10 determines the angular position of cone 5 and prevents it from rotating when clamping or disengagement of the toolholder is being carried out.

The operation of the device is as follows:

Supposing a toolholder is to be changed, one takes hold of lever 1 and turns it so as to thread the nut 2 in the bush 3. The portion 4' is consequently disengaged from nut 2 and contemporaneously the shank of bolt 9 presses against the top of cone 5 and facilitates the disengagement of the same from the tapered recess in support 6. When the lever 1 has been rotated about 90°, the slot 2' lies under the widened portion 4' and the cone falls on washer 8 without going further because the widened portion 4' is at right angles to slot 8'. In order to draw out completely the toolholder, cone 5 has to be rotated by hand by a further 90°.

Clamping of the toolholder is effected by rotating in the opposite direction lever 1, so that nut 2 is threaded out of bush 3 and cone 5 is pulled upward.

1. A device for the quick change of a toolholder, comprising a support having a conical recess therein, a conical member releasably disposed in the recess and having a neck having a T-shaped head thereon, a nut screw-threadedly received in said support axially of said neck, said nut having a recess therein that receives said T-shaped head with axial clearance, said nut having a first slot through which said T-shaped head passes in only one position of rotation of said head and nut relative to each other, said support having a second T-shaped slot therein through which said head passes only after said head has passed through said first slot and has been rotated about its axis through a predetermined angle.

2. A device as claimed in claim 1, and a handle secured to said nut.

3. A device as claimed in claim 1, and a screw-threaded bolt that extends axially through said nut into said recess in said nut.

* * * * *